US009565705B2

(12) United States Patent
Noh et al.

(10) Patent No.: US 9,565,705 B2
(45) Date of Patent: Feb. 7, 2017

(54) APPARATUS AND METHOD FOR AVOIDING MESSAGE COLLISION BETWEEN V2V COMMUNICATION

(71) Applicants: Hyundai Motor Company, Seoul (KR); Kia Motors Corporation, Seoul (KR); Korea University Research and Business Foundation, Seoul (KR)

(72) Inventors: Dong Gyu Noh, Gyeonggi-do (KR); Jong Rok Park, Seoul (KR); Ji Hun Ha, Seoul (KR); Yong Tae Park, Gyeonggi-do (KR); Hyo Gon Kim, Seoul (KR); Byung Jo Kim, Seoul (KR)

(73) Assignees: Hyundai Motor Company, Seoul (KR); Kia Motors Corporation, Seoul (KR); Korea University Research and Business Foundation, Seoul (KR)

( * ) Notice: Subject to any disclaimer, the term of this patent is extended or adjusted under 35 U.S.C. 154(b) by 99 days.

(21) Appl. No.: 14/458,622

(22) Filed: Aug. 13, 2014

(65) Prior Publication Data
US 2015/0172956 A1    Jun. 18, 2015

(30) Foreign Application Priority Data
Dec. 18, 2013 (KR) .......................... 10-2013-0158400

(51) Int. Cl.
*H04W 28/04* (2009.01)
*H04W 74/08* (2009.01)
*H04W 72/04* (2009.01)

(52) U.S. Cl.
CPC ..... *H04W 74/0858* (2013.01); *H04W 72/0446* (2013.01)

(58) Field of Classification Search
CPC ................... H04W 74/0858; H04W 72/0446; H04W 28/16–28/22; H04W 4/008; H04B 1/3822; H04B 1/082; H04B 1/086; H04L 29/12849; H04L 61/6027; H04L 2209/84; G08G 1/161; G08G 1/0112; G08G 1/163; H04J 3/1694; H04H 60/80
See application file for complete search history.

(56) References Cited

U.S. PATENT DOCUMENTS

| 8,520,695 B1 * | 8/2013 | Rubin ...................... G08G 9/02 370/337 |
| 2009/0129364 A1 | 5/2009 | Lee et al. |

(Continued)

FOREIGN PATENT DOCUMENTS

| JP | 2010-219802 A | 9/2010 |
| KR | 10-2006-0073760 A | 6/2006 |

(Continued)

OTHER PUBLICATIONS

Ha, J. et al., "Adaptive Transmission Frequency Control Algorithm Using Channel Busy Percentage in WAVE Environment", 2013 Autumn Conference Theses Collection, Korea University, Nov. 2013.

(Continued)

*Primary Examiner* — Charles C Jiang
*Assistant Examiner* — Rose Clark
(74) *Attorney, Agent, or Firm* — Mintz Levin Cohn Ferris Glovsky and Popeo, P.C.; Peter F. Corless

(57) ABSTRACT

An apparatus for avoiding a message collision between vehicle to vehicle (V2V) communications may include a channel busy percentage (CBP) determiner configured to determine a CBP and a controller configured to establish a data rate based on the determined CBP. When the CBP exceeds a preset reference value, the controller may adapt the data rate to an upper data rate. A method, system, and (Continued)

computer readable medium are further disclosed for performing the same.

11 Claims, 7 Drawing Sheets

(56) References Cited

U.S. PATENT DOCUMENTS

| | | | | |
|---|---|---|---|---|
| 2011/0128849 A1* | 6/2011 | Guo | ................ | H04W 28/10 |
| | | | | 370/235 |
| 2011/0140968 A1 | 6/2011 | Bai et al. | | |
| 2013/0094493 A1 | 4/2013 | Batsuuri et al. | | |
| 2013/0336120 A1* | 12/2013 | Bai | ................ | H04W 28/0231 |
| | | | | 370/235 |
| 2014/0092735 A1* | 4/2014 | Lee | ................ | H04W 28/0231 |
| | | | | 370/230 |
| 2014/0119210 A1* | 5/2014 | Bansal | ................ | H04L 47/263 |
| | | | | 370/252 |
| 2015/0296411 A1* | 10/2015 | Meyer | ................ | G08G 1/0112 |
| | | | | 370/336 |

FOREIGN PATENT DOCUMENTS

| | | |
|---|---|---|
| KR | 10-2006-0099734 A | 9/2006 |
| KR | 10-2009-0052567 | 5/2009 |
| KR | 10-1004673 | 1/2011 |

OTHER PUBLICATIONS

Sung et al., "Development of Reliable V2V system based on WAVE", 23rd ESV, Paper No. 13-0474-O (2013).

* cited by examiner

APPARATUS AND METHOD FOR AVOIDING MESSAGE COLLISION BETWEEN V2V COMMUNICATION

CROSS-REFERENCE TO RELATED APPLICATION

This application claims priority to and the benefit of Korean Patent Application No. 10-2013-0158400, filed on Dec. 18, 2013 in the Korean Intellectual Property Office, the disclosure of which is incorporated herein in its entirety by reference.

TECHNICAL FIELD

The present disclosure relates to techniques for avoiding a message collision between vehicle to vehicle (V2V) communications.

BACKGROUND

IEEE wireless access in vehicular environments (WAVE), which is a vehicle to vehicle (V2V) communication standard, uses a basic safety message (BSM) as the most basic transmission method to recognize surrounding vehicles. For safe driving and fast networking, the BSM may be maximally transmitted within the allowable transmission environment.

The greater the number of vehicles on the road, the more BSMs are generated. Therefore, the possibility that a busy situation occurs in a channel used in the WAVE is increased.

When a busy situation occurs, a method of reducing the strength of message transmission may be considered. However, the method of temporarily reducing transmission strength has potential drawbacks. To this point, an example of this method is illustrated in FIG. 1.

FIG. 1 is a conceptual diagram illustrating the hidden terminal problem (HTP) maintained when the transmission strength is reduced in response to the busy situation, as described above.

FIG. 1 illustrates vehicle A, vehicle B, and vehicle C, as well as a communication range corresponding to each of the vehicles. In particular, vehicle A may communicate with vehicle B, and vehicle B may communicate with vehicle C. However, vehicles A and C are disposed outside the communication range therebetween. Since carrier sensing and the like are performed based on vehicle A, vehicle A determines that vehicle B does not communicate with other vehicles (for example, vehicle C) to transmit its own message. This may also be applied to vehicle C.

Even though the transmission strength can be reduced in response to the busy situation, vehicles which have the HTP relation still exist. Therefore, the reduction in receiving rate of a successful message (for example, BSM) is inevitable.

Accordingly, in V2V communication or vehicle to infra/vehicle/nomadic communication (V2X), when the busy situation occurs, a serious problem in recognizing surrounding vehicles may occur. Due to the small size of the contention window, as defined in the IEEE 802.11p revised bill, the opportunity to avoid a media access control (MAC) message collision is limited. In particular, the contention increases at the initial stage of message transmission.

SUMMARY

The disclosed embodiments have been made in order to solve the above-mentioned problems occurring in the prior art while advantages achieved by the prior art are maintained intact. According to embodiments of the present disclosure, to avoid the message collision, the presence of a busy situation is determined according to a channel busy percentage (CBP), and if it is determined to be the busy situation, a method of reducing the CBP and the HTP by transmitting a message using an upper data rate is provided.

According to embodiments of the present disclosure, an apparatus for avoiding a message collision between V2V communications includes a CBP determiner configured to determine a CBP and a controller configured to establish a data rate based on the determined CBP. When the CBP exceeds a preset reference value, the controller may adapt the data rate to an upper data rate. The CBP may be determined based on at least one of a vehicle speed, a transmission attempt failure rate, and a channel use rate.

The controller may compare an average value of data rates included in a message received from at least one vehicle positioned therearound with the data rate, and when the average value is the data rate or more, the controller may adapt the data rate to the upper rate. The controller may also establish a message transmission frequency when the data rate is an uppermost data rate.

Further, the V2V message may be transmitted by selecting an epoch having a predetermined time length, and the controller may determine an epoch utilization for a plurality of epochs to select a first epoch having a lowest epoch utilization and transmit the message accordingly. When the epoch utilization of the first epoch is increased, the controller may move the message to a second epoch having an epoch utilization lower than an average value. The second epoch may be included in an interval subsequent to the interval in which the first epoch is included. Also, the controller may divide the epoch into a plurality of sections to transmit the message at a timing of any of the plurality of sections. The plurality of sections may be determined in response to the data rate.

Further, according to embodiments of the present disclosure, a vehicle system for avoiding a message collision between V2V communications includes a communicator configured to communicate with at least one vehicle positioned therearound, a CBP determiner configured to determine a CBP, and a controller configured to establish a data rate based on the determined CBP. When the CBP exceeds a preset reference value, the controller may adapt the data rate to an upper data rate.

Even further, according to embodiments of the present disclosure, a method for avoiding a message collision between V2V communications includes determining, by a CBP determiner, a CBP, and establishing, by a controller, a data rate based on the determined CBP. When the CBP exceeds a preset reference value, the controller may adapt the data rate to an upper data rate.

Even further yet, according to embodiments of the present disclosure, a recording medium recorded with a program code for performing the method as described above is provided.

The present disclosure is not limited to contents disclosed herein for the above-stated purposes, but the detailed contents for carrying out the disclosed embodiments and the intention mentioned in claims are to be construed as being included in the present disclosure.

BRIEF DESCRIPTION OF THE DRAWINGS

The above and other objects, features and advantages of the present disclosure will be more apparent from the following detailed description taken in conjunction with the accompanying drawings.

Figure 1:
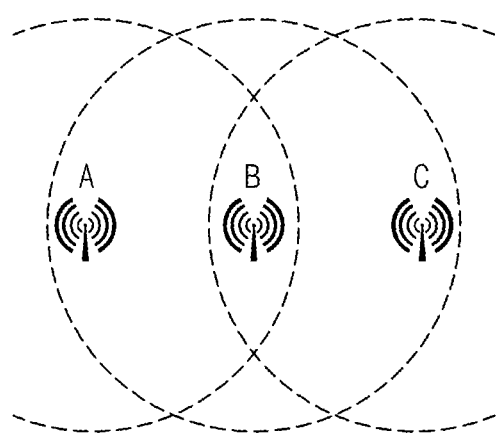
FIG. 1 is a conceptual diagram illustrating HTP maintained when a transmission strength is reduced in response to a busy situation.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

Hereinafter, embodiments of the present disclosure will be described with reference to the accompanying drawings. At this time, it is noted that like reference numerals denote like elements in appreciating the drawings. Moreover, detailed descriptions related to well-known functions or configurations will be ruled out in order not to unnecessarily obscure the subject matter of the present disclosure. It is to be noted that only parts necessary to understand operations according to embodiments of the present disclosure will be described below and the description of other parts will be omitted so as not to unnecessarily obscure the subject matter of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods may be executed by at least one controller. The term "controller" refers to a hardware device that includes a memory and a processor. The memory is configured to store program instructions, and the processor is configured to execute the program instructions to perform one or more processes which are described further below. Moreover, it is understood that the below methods may be executed by an apparatus comprising the controller, whereby the apparatus is known in the art to be suitable for being operated according to a processor configured to avoid collisions in V2V communications.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, an electronic apparatus of the present disclosure may include all the devices which include all the information communication devices supporting functions described in various exemplary embodiments of the present disclosure, multi-media devices, and an application processor (AP), a graphic processing unit (GPU), and a central processing unit (CPU) as application devices therefor. For example, the electronic apparatus may include a tablet personal computer (PC), a smart phone, a digital camera, a portable multimedia player (PMP), telematics, a navigation device, an in-vehicle system, and the like, in addition to mobile communication terminals operated based on each communication protocol corresponding to various communication systems.

Figure 2:
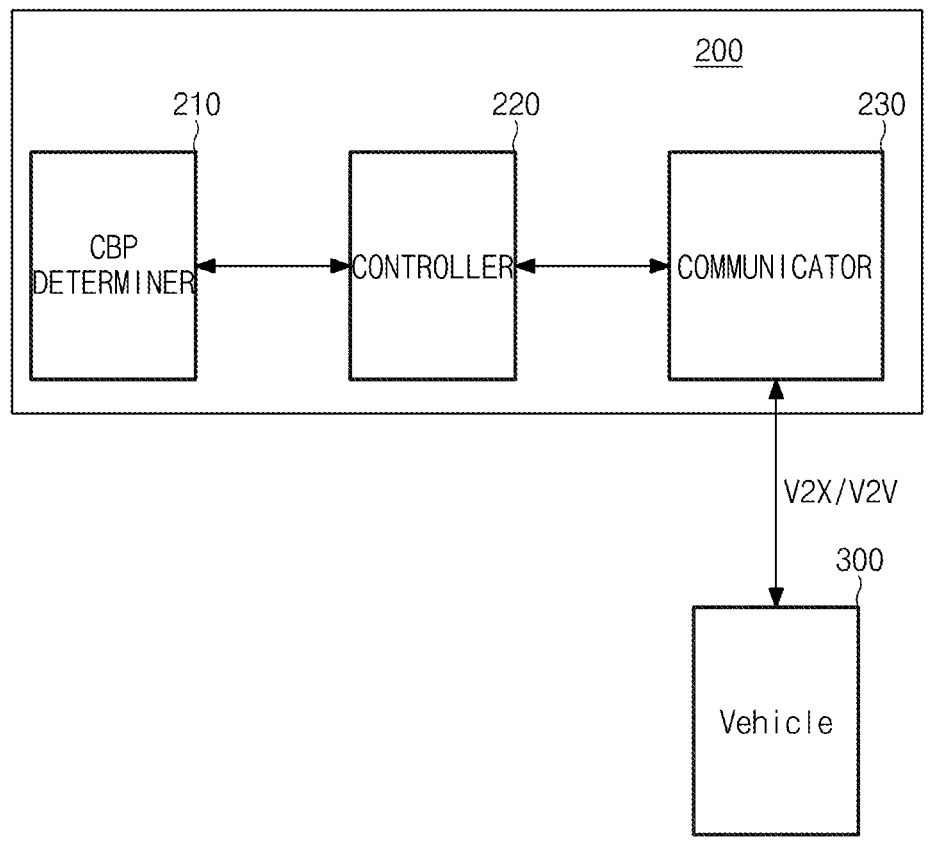
FIG. 2 is an exemplary conceptual diagram of an apparatus for avoiding a message collision according to embodiments of the present disclosure.

FIG. 2 is an exemplary conceptual diagram of an apparatus for avoiding a message collision according to embodiments of the present disclosure.

Referring to FIG. 2, an apparatus 200 for avoiding a message collision according to embodiments of the present disclosure may include a CBP determiner 210, a controller 220, and a communicator 230. A configuration of the apparatus 200 for avoiding a message collision is not limited to the aforementioned contents, but may be added or deleted at a level apparent to those skilled in the art. For example, the CBP determiner 210 and the communicator 230 may be integrally implemented in a single hardware module or the CBP determiner 210 and the controller 220 may be integrally implemented.

The CBP determiner 210 may determine a congestion level of a channel, that is, a channel busy percentage (CBP), in a network with which a vehicle communicates. The CBP determiner 210 may determine the CBP based on at least one of a vehicle speed, a message transmission attempt failure rate, a channel use rate, and a position tracking error (PET). Further, the CBP may be acquired by the channel use rate. The PTE is described below with reference to FIG. 3.

The controller 220 may establish a data rate based on the CBP. As an example, there are eight data rates of 3 Mbps to 27 Mbps in the IEEE WAVE 802.11p environment. Basically, a vehicle uses a data rate of 6 Mbps to transmit a message. When a reference value of the CBP is 60%, and the measured CBP is e.g., 80%, and thus exceeds the reference value, the controller 220 may establish a current data rate of, for example, 6 Mbps, to a data rate of, for example, 9 Mpbs, which is one level up from the current data rate. Data rate establishment and other technical features which are performed by the controller 220 are described below with reference to FIGS. 4 to 6.

The communicator 230 may perform a function of communicating with another vehicle 300 (e.g., V2V), and the like. Further, the communicator 230 may communicate with communication infrastructure, such as a base station (e.g., V2X). To perform the aforementioned functions, the communicator 230 may support known wireless communications such as wireless wide area network (WWAN), Wi-Fi, and Bluetooth.

Figure 3:
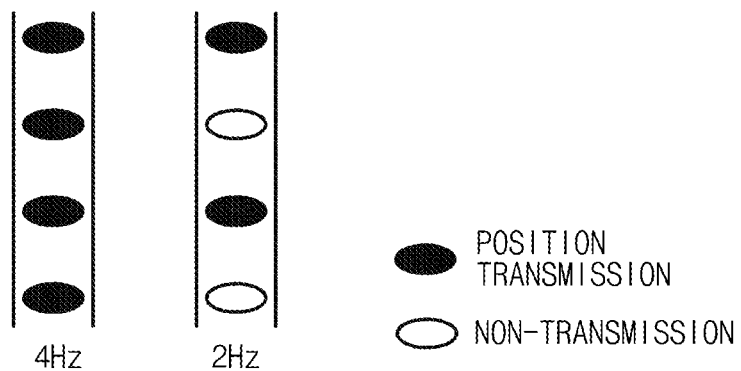
FIG. 3 is an exemplary conceptual diagram of a position tracking error (PTE)

FIG. 3 is an exemplary conceptual diagram of a position tracking error (PTE). For example, when a traffic jam occurs and the number of vehicles is increased, the average vehicle speed is reduced, and many vehicles attempt the message transmission simultaneously. Thus, the failure rate of the message transmissions attempted by each vehicle can increase and a channel use rate is also increased. Therefore, the amount of messages received (e.g., BSM) is reduced, and the apparatus 200 for avoiding a message collision has old information, such that the PTE value is increased.

For example, when the message transmission frequency is reduced in half from 4 Hz to 2 Hz, the message itself is transmitted, and thus, the busy situation is temporarily solved; however, a small amount of new messages having the latest information can arrive, thereby increasing the PTE value. That is, solving the busy situation by simply reducing the vehicle communication transmission frequency may ultimately be ineffective.

Figure 4:
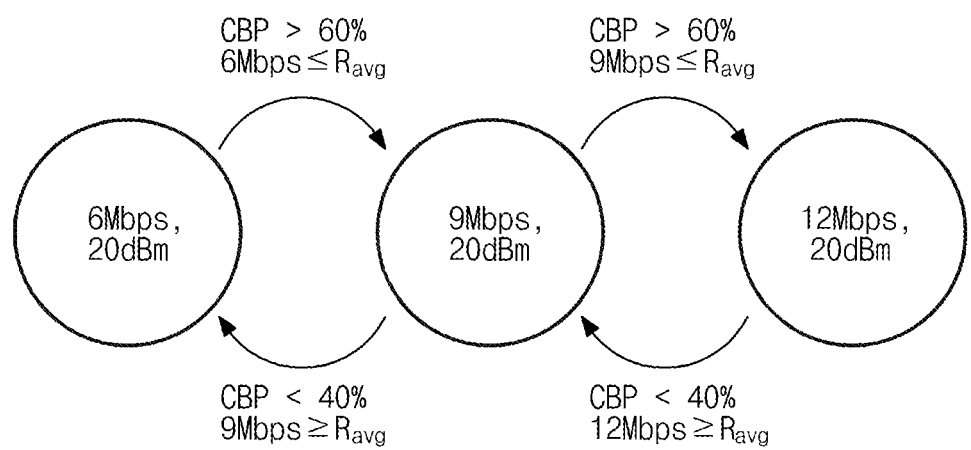
FIG. 4 is an exemplary conceptual diagram of establishing a data rate according to embodiments of the present disclosure.

FIG. 4 is an exemplary conceptual diagram of an adjustment of a data rate according to embodiments of the present disclosure.

Referring to FIG. 4, a basic data rate used to transmit the V2V message is 6 Mbps, as an example, and a reference CBP for increasing the data rate is 60%, as an example. The reference CBP for adapting the data rate downward is 40%, as an example. When the CBP determined by the CBP determiner 210 exceeds 60%, the controller 220 may adapt the data rate upwardly to 9 Mbps, as an example. As a result, when the data rate is adapted upward, the CBP is reduced. In this case, the CBP is reduced to 40% as a solution of traffic jams, and the like, which means that a vehicle density is not high. Therefore, the controller 220 may again adapt the data rate downwardly to 6 Mbps. This enables relatively long distance communication with other vehicles.

To prevent the data rate anomaly phenomenon from occurring, compared with an average data rate R avg, the data rate may be changed. For example, the apparatus 200 for avoiding a message collision may acquire an average value of the data rates included in the message received from at least one of the other vehicles 300, which are positioned around the vehicle in which the apparatus 200 is equipped, through the communicator 230, and the like. The data rate may be included as a header of the received message. When the so acquired average value of the data rates is more than a current data rate of the apparatus 200 for avoiding a message collision, the controller 220 may establish the current data rate of the vehicle 300 as a data rate which is one level up from the current data rate.

In the illustrated example, if it is determined that the CBP exceeds the preset reference value (that is, 60%) even in 9 Mbps, the data rate may be adapted to a data rate which is one level up. That is, the data rate may be adapted to 12 Mbps. A range of the data rate and an interval between the data rates may be set to have a maximum value which may be allowed by a communication protocol. For example, in the aforementioned IEEE WAVE 802.11p standard, the data rate may be set at an interval of 3 Mbps from 3 Mbps to 27 Mbps. However, the maximum or minimum data rate may be arbitrarily limited to 21 Mbps, 12 Mbps, or the like, in some cases. As in the illustrated example, when the maximum data rate is 12 Mbps, and the current data rate is also 12 Mbps, the data rate may no longer be established as the upper data rate. In this case, the message transmission frequency adaptation may be performed.

That is, when the current determined CBP is the preset reference value or more, and the current data rate is the maximum data rate, the controller 220 may establish the message transmission frequency thusly. As described above, the message transmission frequency of the apparatus 200 for avoiding a message collision may be maintained in a maximum state if possible by performing the message transmission frequency adaptation only in the maximum data rate situation.

The transmission frequency adaptation may be implemented by calculating transmission probability internally, determining whether the message is actually transmitted using the transmission probability at the message transmission time, and performing the message transmission. The transmission probability $P_{tx}(t)$ may be represented by a product $P_{tx}(t-1)$ of a ratio of the current CBP CBP_current and the preset reference CBP CBP_upper and transmission probability selected immediately before. For example, the transmission probability $P_{tx}(t)$ may be represented as follows.

$$P_{tx}(t) = \min\left(\left(P_{tx}(t-1) \times \frac{CBP_{upper}}{CBP_{current}}\right), 1.0\right)$$

After the data rate adaptation and/or the transmission frequency adaptation is performed, a phase control may be performed to reduce the PTE. When the PTE is reduced, a message transmitted at a specific transmission frequency may be relatively transmitted well without collision. Moreover, even when the CBP is high, it is possible to avoid message collisions using phase control, as demonstrated in FIG. 5.

Figure 5:
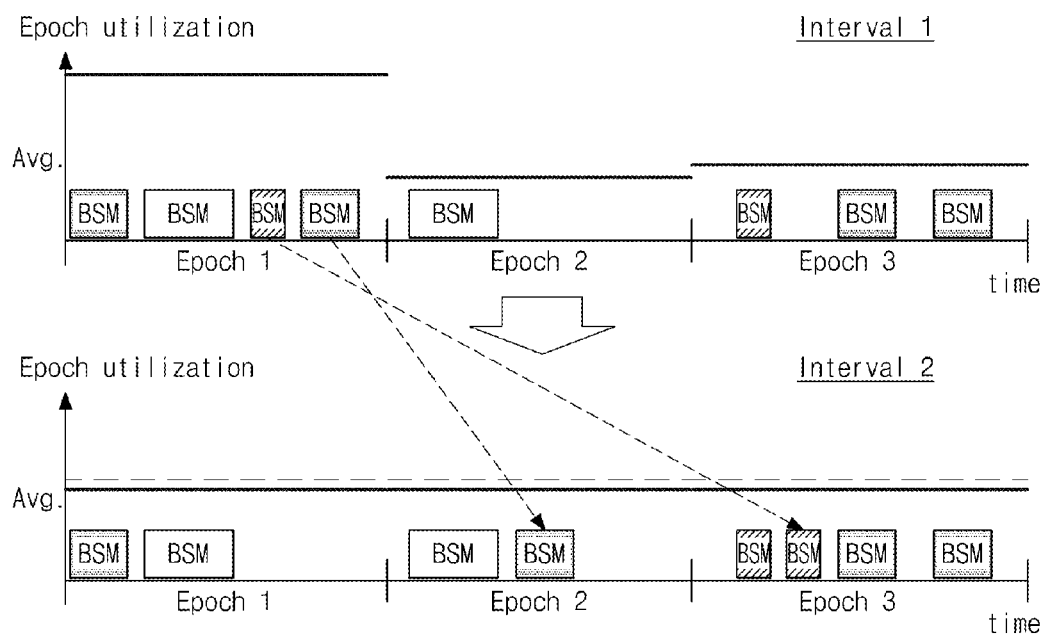
FIG. 5 is an exemplary conceptual diagram of a phase control according to embodiments of the present disclosure.

FIG. 5 is an exemplary conceptual diagram of a phase control according to embodiments of the present disclosure.

The timing of when the message is transmitted may follow the abstracted time structure of the application layer in the communication network. That is, the message may be transmitted by selecting one epoch. In the example illustrated in FIG. 5, a length of one epoch may be 2 ms and a length of one interval may be 100 ms. In this case, 50 epochs can form one interval. The controller 220 may determine an epoch utilization value for each epoch included in the interval. The controller 220 can then select an epoch in which the determined epoch utilization has the lowest value so as to be able to transmit a message.

However, since the epoch selected by the other vehicles 300 may not be known, the epoch utilization of the epoch selected by the controller may be higher than an average value. In the illustrated example, even though the controller 220 selects a first epoch in which the epoch utilization is lowest at an early stage in a first interval so as to transmit the messages, the first epoch may include four BSMs, a second epoch may include one BSM, and a third epoch may include three BSMs. In this case, the epoch utilization of the first epoch is greater than the average epoch utilization. In this situation, the phase control is performed in the next interval, that is, a second interval. For example, the controller 220 selects an epoch having a value lower than the average epoch utilization in order to transmit at least some of the messages included in the first epoch having a value higher than the average epoch utilization. As described above, when the BSM (message) transmission is uniformly distributed with respect to a time base, the unnecessary media access control (MAC) collision or the HTP problem is mitigated, and thus the BSM data rate is increased, such that the PTE may be reduced.

Figure 6:
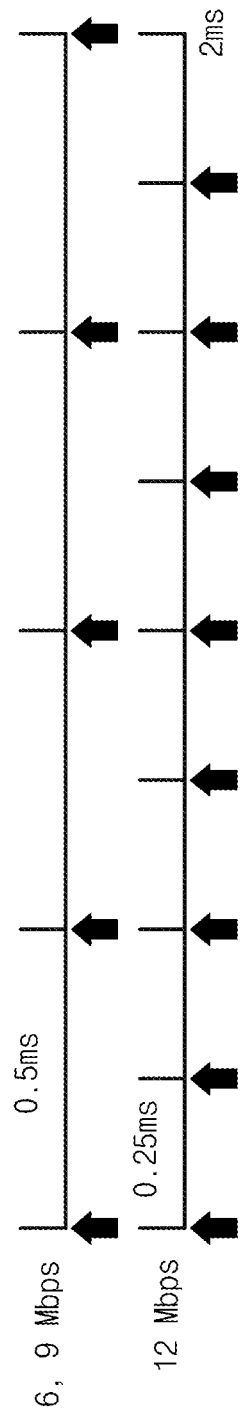
FIG. 6 is an exemplary conceptual diagram of an intra-epoch selection according to embodiments of the present disclosure.

FIG. 6 is an exemplary conceptual diagram of an intra-epoch selection according to embodiments of the present disclosure.

Referring to FIG. 6, the controller 220 may differently configure the number of intra-epochs and starting times in response to the data rate used for the particular message transmission. As an example, the transmission timing may be controlled to an interval of 0.5 ms within one epoch having a time length of 2 ms at the data rates of 6 Mbps and 9 Mbps. As another example, the transmission timing may be controlled at an interval of 0.25 ms at the data rate of 12 Mbps. Generally, the transmission timing included in one epoch may be increased in response to the data rate. On the other hand, as the data rate decreases, the number of intra-epochs included in the epoch may be reduced as such. For example, a total of two intra-epochs may be selected at an interval of 1 ms at the data rate of 3 Mbps.

The controller 220 may arbitrarily select the intra-epochs each time the message is transmitted. Further, the transmission timing may be controlled to be suited for the intra-epoch selected by using application jitter and post backoff.

Figure 7:
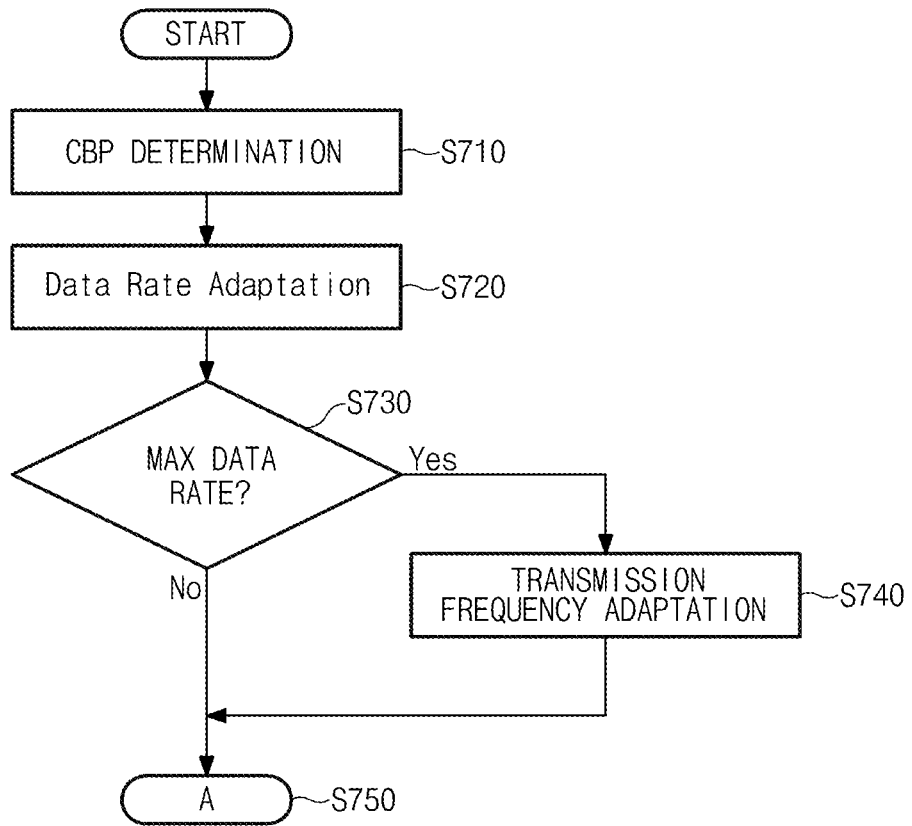
FIG. 7 is an exemplary flow chart of a method for avoiding a message collision according to embodiments of the present disclosure.

FIG. 7 is an exemplary flow chart of a method for avoiding a message collision according to embodiments of the present disclosure. In the following description, the overlapping description with the aforementioned contents will be omitted.

Referring to FIG. 7, in S710, the determination of the channel busy percentage (CBP) is performed. The determination may be performed by the CBP determiner 210. The data rate may be established based on the CBP that is determined in S720. Next, in S730, it may be determined whether the current data rate is a maximum data rate. When the current data rate is the maximum data rate, the transmission frequency adaptation process may be further performed (S740). When the current data rate is not the maximum data rate, the process may move to process A (S750).

The process A (S750) may be implemented by various methods. As one example, in S720, if it is determined to be enough to solve the busy situation by increasing the data rate by one level, the entire process may end. As another example, after the data rate adaptation and/or the transmission frequency adaptation is performed, the aforementioned phase control or the intra-epoch selection process may be performed in succession. The description thereof is already described and therefore will be omitted.

In the present specification, elements represented as a means for performing a specific function comprehensively include any method of performing the specific function, and an example of the elements may include a combination of circuit elements performing the specific function, firmware coupled with circuit elements suitable to execute software including program instructions for performing the specific function, and the like.

In the present specification, 'one embodiment' of principles of the present disclosure and various changes of the expression means that specific features, structures, characteristics, and the like, associated with the embodiment are included in at least one embodiment of the principle of the present disclosure. Therefore, the expression 'an embodiment' and any other modification examples disclosed throughout the present specification do not necessarily mean the same embodiment.

According to embodiments of the present disclosure, the busy situation is determined according to the CBP, and if it is determined to be the busy situation, the message is transmitted using the upper data rate. Therefore, the network may accept additional BSM transmissions by reducing the CBP and avoiding the frequent collision due to the busy situation. That is, it is possible to improve the BSM data rate, while also maintaining the low CBP and PTE.

Further, according to embodiments of the present disclosure, the transmission frequency is controlled at the uppermost data rate. That is, it is possible to continuously maintain the high transmission frequency by performing the transmission frequency control according to the upper data rate.

Further, according to embodiments of the present disclosure, it is possible to avoid the unnecessary MAC collisions by using the epoch concept (e.g., the abstracted time structure of the application layer) and controlling the transmission timing according to the structure.

Further, according to embodiments of the present disclosure, when the upper data rate is used for the message transmission, the transmission time may be reduced, and as a result, the HTP may also be reduced.

Further, according to embodiments of the present disclosure, it is possible to prevent the ghost node from occurring due to the data rate anomaly phenomenon.

All the embodiments and conditional examples disclosed in the present specification are described so as to help a person having ordinary skill in the art to which the present disclosure pertains to understand the principles and concepts of the present disclosure. Those skilled in the art should understand that the present disclosure may be implemented in a modified form that does not deviate from the essential characteristics of the present disclosure. Therefore, the embodiments disclosed herein should be considered illustrative descriptions rather than restrictive descriptions. The scope of the present disclosure should be defined by the following claims rather than the above-mentioned description, and all technical features within the spirit of the following claims should be interpreted as being included in the present disclosure.

What is claimed is:

1. An apparatus for avoiding a message collision between vehicle to vehicle (V2V) communications, comprising:
    a controller configured to determine a channel busy percentage (CBP) based on a vehicle speed, a transmission attempt failure rate, and a channel use rate and configured to establish a data rate based on the determined CBP, wherein
    when the CBP exceeds a preset reference value, the controller is further configured to adapt the data rate to an upper data rate,
    a V2V message is transmitted by selecting an epoch having a predetermined time length,
    the controller is further configured to determine an epoch utilization for a plurality of epochs, to select a first epoch having a lowest epoch utilization, and to transmit the V2V message according to the selected first epoch,
    when the epoch utilization of the first epoch is increased, the controller is further configured to move the message to a second epoch having an epoch utilization lower than an average epoch utilization value, and the second epoch is included in an interval subsequent to the interval in which the first epoch is included.

2. The apparatus according to claim 1, wherein the controller is further configured to compare the data rate to an average value of data rates included in a message received from at least one vehicle that is positioned therearound, and when the average value of the data rates is equal to or greater than the data rate, adapt the data rate to the upper data rate.

3. The apparatus according to claim 1, wherein the controller is further configured to establish a message transmission frequency when the data rate is an uppermost data rate.

4. The apparatus according to claim 1, wherein a V2V message is transmitted by selecting an epoch having a predetermined time length, and the controller is further configured to divide the epoch into a plurality of sections and to transmit the message at a timing of any of the plurality of sections.

5. The apparatus according to claim 4, wherein the plurality of sections are determined in response to the data rate.

6. A vehicle system for avoiding a message collision between vehicle to vehicle (V2V) communications, comprising:

a communicator configured to communicate with at least one vehicle that is positioned therearound; and a controller configured to determine a channel busy percentage (CBP) based on a vehicle speed, a transmission attempt failure rate, and a channel use rate and configured to establish a data rate based on the determined CBP, wherein when the CBP exceeds a preset reference value, the controller is further configured to adapt the data rate to an upper data rate, a V2V message is transmitted by selecting an epoch having a predetermined time length, the controller is further configured to determine an epoch utilization for a plurality of epochs, to select a first epoch having a lowest epoch utilization, and to transmit the V2V message according to the selected first epoch, when the epoch utilization of the first epoch is increased, the controller is further configured to move the message to a second epoch having an epoch utilization lower than an average epoch utilization value, and the second epoch is included in an interval subsequent to the interval in which the first epoch is included.

7. A method for avoiding a message collision between vehicle to vehicle (V2V) communications, comprising:

determining, by a controller, a channel busy percentage (CBP) based on a vehicle speed, a transmission attempt failure rate, and a channel use rate;

establishing, by the controller, a data rate based on the determined CBP; and adapting, by the controller, the data rate to an upper data rate when the CBP exceeds a preset reference value, wherein a V2V message is transmitted by selecting an epoch having a predetermined time length, the message is transmitted by selecting a first epoch having a lowest epoch utilization based on a determination of epoch utilization for a plurality of epochs, when the epoch utilization of the first epoch is increased, the message moves to a second epoch having an epoch utilization lower than an average epoch utilization value, and the second epoch is included in an interval subsequent to the interval in which the first epoch is included.

8. The method according to claim 7, wherein in the establishing of the data rate comprises:

comparing, by the controller, the data rate to an average value of data rates included in a message received from at least one vehicle that is positioned therearound, and adapting, by the controller, the data rate to the upper data rate when the average value is equal to or greater than the data rate.

9. The method according to claim 7, further comprising: when the data rate is an uppermost data rate, establishing a message transmission frequency.

10. The method according to claim 7, wherein a V2V message is transmitted by selecting an epoch having a predetermined time length, and the epoch is divided into a plurality of sections to transmit the message at a timing of any of the plurality of sections.

11. The method according to claim 10, wherein the plurality of sections are determined in response to the data rate.

* * * * *